(12) United States Patent
Shim et al.

(10) Patent No.: US 12,355,910 B2
(45) Date of Patent: Jul. 8, 2025

(54) ELECTRONIC APPARATUS INCLUDING MICROPHONE MODULE

(71) Applicant: SAMSUNG ELECTRONICS CO., LTD., Suwon-si (KR)

(72) Inventors: Minchang Shim, Suwon-si (KR); Heecheul Moon, Suwon-si (KR); Kwonho Son, Suwon-si (KR); Yongseok Lee, Suwon-si (KR); Sangmin Kim, Suwon-si (KR); Daeyoung Noh, Suwon-si (KR); Sangyoup Seok, Suwon-si (KR); Yanggyun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 18/142,426

(22) Filed: May 2, 2023

(65) Prior Publication Data
US 2023/0269319 A1   Aug. 24, 2023

Related U.S. Application Data

(63) Continuation of application No. PCT/KR2022/000549, filed on Jan. 12, 2022.

(30) Foreign Application Priority Data

Jan. 12, 2021 (KR) .................. 10-2021-0003866
Mar. 19, 2021 (KR) .................. 10-2021-0036083

(51) Int. Cl.
*H04M 1/02* (2006.01)
*G06F 1/16* (2006.01)
(Continued)

(52) U.S. Cl.
CPC ............ *H04M 1/03* (2013.01); *G06F 1/1684* (2013.01); *H04M 1/0264* (2013.01);
(Continued)

(58) Field of Classification Search
CPC .... G06F 1/1684; G06F 1/1686; G06F 1/1688; H04M 1/0264; H04R 2499/11
See application file for complete search history.

(56) References Cited

U.S. PATENT DOCUMENTS 9,031,620 B2   5/2015   Ko et al.
9,538,052 B2   1/2017   Sanford et al.
(Continued)

FOREIGN PATENT DOCUMENTS

CN   104821972 A   8/2015
CN   114430430 A   5/2022
(Continued)

OTHER PUBLICATIONS

Communication issued Mar. 19, 2024 by the European Patent Office in European Patent Application No. 22739665.2.
(Continued)

*Primary Examiner* — Adrian S Wilson
(74) *Attorney, Agent, or Firm* — Sughrue Mion, PLLC

(57) ABSTRACT

An electronic device includes a housing; a printed circuit board; a microphone substrate; a microphone; a flash; a cover, the cover having an opening at least partially aligned with the flash; a flash window facing the cover, the flash window including a first part at least partially accommodated in the opening and at least partially aligned with the flash in the first direction, and a second part extended from the first part and between the cover and the microphone substrate; and an audio input path configured to propagate a sound wave to the microphone, wherein the audio input path may include a space provided between the flash window and
(Continued)

the cover, a gap provided between the first part and an inner wall of the opening and fluidly connected to the space, and a microphone hole in the second part and fluidly connected to the microphone and the space.

20 Claims, 12 Drawing Sheets

(51) Int. Cl.
*H04M 1/03* (2006.01)
*H04R 1/08* (2006.01)
*H04R 1/22* (2006.01)

(52) U.S. Cl.
CPC ....... *H04M 1/0274* (2013.01); *H04M 1/0277* (2013.01); *H04R 1/08* (2013.01); *H04R 1/222* (2013.01); *H04R 2499/11* (2013.01)

(56) References Cited

U.S. PATENT DOCUMENTS

| | | | |
|---|---|---|---|
| 9,554,041 B1* | 1/2017 | Shin | H04N 23/90 |
| 9,628,595 B2 | 4/2017 | Ko et al. | |
| 9,736,283 B2 | 8/2017 | Pope et al. | |
| 9,999,149 B2 | 6/2018 | Jun et al. | |
| 10,070,025 B2 | 9/2018 | Sanford et al. | |
| 10,257,333 B2 | 4/2019 | Kim et al. | |
| 10,268,234 B2 | 4/2019 | Fletcher et al. | |
| 10,425,561 B2 | 9/2019 | Jarvis et al. | |
| 10,491,786 B2 | 11/2019 | Sanford et al. | |
| 10,701,250 B2 | 6/2020 | Jarvis et al. | |
| 10,904,412 B2 | 1/2021 | Jarvis et al. | |
| 10,963,006 B2 | 3/2021 | Fletcher et al. | |
| 10,983,555 B2 | 4/2021 | Fletcher et al. | |
| 10,996,713 B2 | 5/2021 | Pakula et al. | |
| 11,249,513 B2 | 2/2022 | Fletcher et al. | |
| 11,476,883 B2 | 10/2022 | Kumar et al. | |
| 11,477,355 B2 | 10/2022 | Jarvis et al. | |
| 11,895,379 B2* | 2/2024 | Park | H05K 1/11 |
| 2015/0072727 A1 | 3/2015 | Pope et al. | |
| 2015/0114090 A1 | 4/2015 | Fukuda | |
| 2017/0104901 A1 | 4/2017 | Sanford et al. | |
| 2017/0251564 A1 | 8/2017 | Jun et al. | |
| 2018/0110148 A9 | 4/2018 | Jun et al. | |
| 2018/0241861 A1* | 8/2018 | Kim | H04M 1/18 |
| 2019/0041909 A1 | 2/2019 | Pakula et al. | |
| 2019/0082536 A1* | 3/2019 | Park | H04M 1/0277 |
| 2019/0320050 A1* | 10/2019 | Lim | H04R 1/326 |
| 2020/0093040 A1* | 3/2020 | Yun | H05K 1/181 |
| 2020/0177771 A1* | 6/2020 | Noh | H04N 23/45 |
| 2020/0184943 A1* | 6/2020 | Tisch | H04R 1/08 |
| 2020/0266845 A1 | 8/2020 | Kumar et al. | |
| 2021/0232180 A1 | 7/2021 | Pakula et al. | |
| 2021/0234948 A1* | 7/2021 | Li | H04M 1/0249 |
| 2021/0392736 A1* | 12/2021 | Koo | H05K 1/144 |
| 2022/0393714 A1 | 12/2022 | Kumar et al. | |
| 2023/0020199 A1 | 1/2023 | Jarvis et al. | |

FOREIGN PATENT DOCUMENTS

| | | |
|---|---|---|
| JP | 2020-531947 A | 11/2020 |
| KR | 10-2013-0005934 A | 1/2013 |
| KR | 10-2015-0049292 A | 5/2015 |
| KR | 10-2016-0042054 A | 4/2016 |
| KR | 10-2017-0100368 A | 9/2017 |
| KR | 10-2019-0028284 A | 3/2019 |
| KR | 10-2020-0029415 A | 3/2020 |

OTHER PUBLICATIONS

International Search Report (PCT/ISA/210) issued by the International Searching Authority on Apr. 22, 2022 in International Application No. PCT/KR2022/000549.

Written Opinion (PCT/ISA/237) issued by the International Searching Authority on Apr. 22, 202 in International Application No. PCT/KR2022/000549.

* cited by examiner

ELECTRONIC APPARATUS INCLUDING MICROPHONE MODULE

CROSS-REFERENCE TO RELATED APPLICATIONS

This application is by-pass continuation application of International Application No. PCT/KR2022/000549, filed on Jan. 12, 2022, which based on and claims priority to Korean Patent Application No. 10-2021-0003866, filed on Jan. 12, 2021, in the Korean Intellectual Property Office, and Korean Patent Application No. 10-2021-0036083, filed on Mar. 19, 2021, in the Korean Intellectual Property Office, the disclosures of which are incorporated by reference herein in their entireties.

BACKGROUND

1. Field

The disclosure relates to an electronic device including a microphone module.

2. Description of Related Art

An electronic device may include a plurality of microphone elements therein to receive audio in various directions. An audio input path fluidly connected with the microphone elements may be formed in the electronic device such that audio is input to the microphone elements.

The electronic device may include a camera module for taking a video and an image. In order to receive audio in a camera direction when the camera module takes a video, the audio input path may extend from a region adjacent to the camera module to the microphone elements located inside the electronic device.

In the electronic device of the related art, a microphone hole adjacent to the camera module may be exposed to the exterior, and therefore aesthetics may be degraded. A microphone printed circuit board (PCB) may be connected with a main PCB through a C-Clip, and therefore a mounting region of the main PCB may not be efficiently used. Furthermore, the C-Clip may be disposed in a state of being compressed between a back cover and a PCB, and therefore a gap may be generated between the back cover and the PCB. In addition, moisture may be introduced through the gap or sealing performance may be deteriorated, and therefore noise may be introduced into the microphone elements.

SUMMARY

Provided are an electronic device in which a flash window is accommodated in an opening adjacent to a camera module and an external audio signal is received through a gap between the flash window and the opening.

In addition, provided are an electronic device including an assembly structure of a microphone PCB capable of efficiently using a mounting region of a main PCB and preventing lifting of a back cover.

According to an aspect of the disclosure, an electronic device includes: a housing; a printed circuit board disposed in the housing; a microphone substrate disposed in the housing and electrically connected to the printed circuit board; a microphone disposed on the microphone substrate; a flash disposed on the microphone substrate; a cover disposed to at least partially face the microphone substrate in a first direction and configured to form a portion of a surface of the housing, the cover having an opening at least partially aligned with the flash; a flash window facing the cover, the flash window including a first part at least partially accommodated in the opening and at least partially aligned with the flash in the first direction, and a second part extended from the first part and between the cover and the microphone substrate; and an audio input path configured to propagate a sound wave to the microphone, wherein the audio input path may include a space provided between the flash window and the cover, a gap provided between the first part and an inner wall of the opening and fluidly connected to the space, and a microphone hole in the second part and fluidly connected to the microphone and the space.

The microphone hole penetrates the second part of the flash window such that vibration of air in the space is propagated to a sound inlet of the microphone.

The microphone is at least partially aligned with the second part of the flash window in the first direction.

The microphone substrate may include: a region at least partially flexibly extended toward the printed circuit board; or a flexible connecting member connected to the microphone substrate and the printed circuit board.

The cover may have a recess in which the flash window is disposed, and the flash window may include a protrusion contacting an inner wall of the recess.

The electronic device may further include: an adhesive member disposed between the cover and the flash window and surrounding the space, and when viewed in the first direction, the gap and the microphone hole are disposed in a region surrounded by the adhesive member.

Along the first direction, the adhesive member may be arranged in a closed form sealing the space.

The electronic device may further include a sealing member disposed between the microphone substrate and the flash window, and configured to seal the audio input path.

The microphone substrate may include a second surface facing the flash window, and a first surface facing away from the second surface, the flash may be disposed on the second surface, and the microphone may be disposed on the first surface.

At least a portion of the second part of the flash window may be disposed on the second surface of the microphone substrate, the microphone substrate may have a through-hole penetrating the first surface and the second surface, the through-hole being fluidly connected with the microphone hole and a sound inlet of the microphone, and the audio input path may further include the through-hole.

The electronic device may further include a waterproof member configured to block introduction of moisture into the microphone, and the waterproof member is at least partially disposed in the microphone hole.

The microphone hole may include a first hole portion having a first size and a second hole portion having a second size greater than the first size, and the waterproof member may be at least partially disposed in the second hole portion.

A stepped surface facing the microphone substrate may be formed in the second hole portion, The electronic device may further include: a rear case disposed between the flash window and the microphone substrate, and a second microphone hole fluidly connected with the microphone hole and a sound inlet of the microphone may be disposed in the rear case.

The rear case, when viewed in the first direction, may include an opening region at least partially overlapping the flash and the first part of the flash window, and light emitted from the flash may pass through the region and the first part of the flash window.

According to an aspect of the disclosure, an electronic device includes: a display; a back cover facing the display, the back cover including a first opening and a second opening adjacent to the first opening; a side surrounding a space between the display and the back cover; a camera disposed in a camera region of the back cover and configured to receive light through the first opening; and a microphone module disposed in a flash region of the back cover and configured to receive an audio signal through a portion of the second opening, wherein the microphone module includes: a microphone substrate facing the flash region, the microphone substrate; a microphone disposed on the microphone substrate; a flash disposed on the microphone substrate; a flash window including a first part disposed between the flash and the flash region, and a second part extended from the first part and disposed between the microphone and the flash region, wherein the first part of the flash window may include a protruding portion extended into the second opening; and an adhesive member attaching the flash region and the flash window, wherein a gap fluidly connected to the space is provided between the protruding portion and the second opening, wherein a microphone hole fluidly connected to the microphone is provided in the second part of the flash window, wherein the adhesive member is completely surrounds a region between the flash region and the flash window, and wherein the region between the flash region and the flash window is fluidly connected to the gap and the microphone hole.

A portion of the region between the flash region and the flash window may at least partially overlap the gap, and another portion of the region between the flash region and the flash window may at least partially overlap the microphone hole.

The electronic device may further include a waterproof member which is at least partially disposed in the microphone hole.

A bumpy region configured to induce diffuse reflection of light emitted from the flash may be provided on the first part of the flash window.

The microphone substrate may include a second surface facing the flash window and on which the flash is disposed, and a first surface facing away from the second surface and on which the microphone is disposed, and the microphone hole may be extended from the first surface and penetrates the second surface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
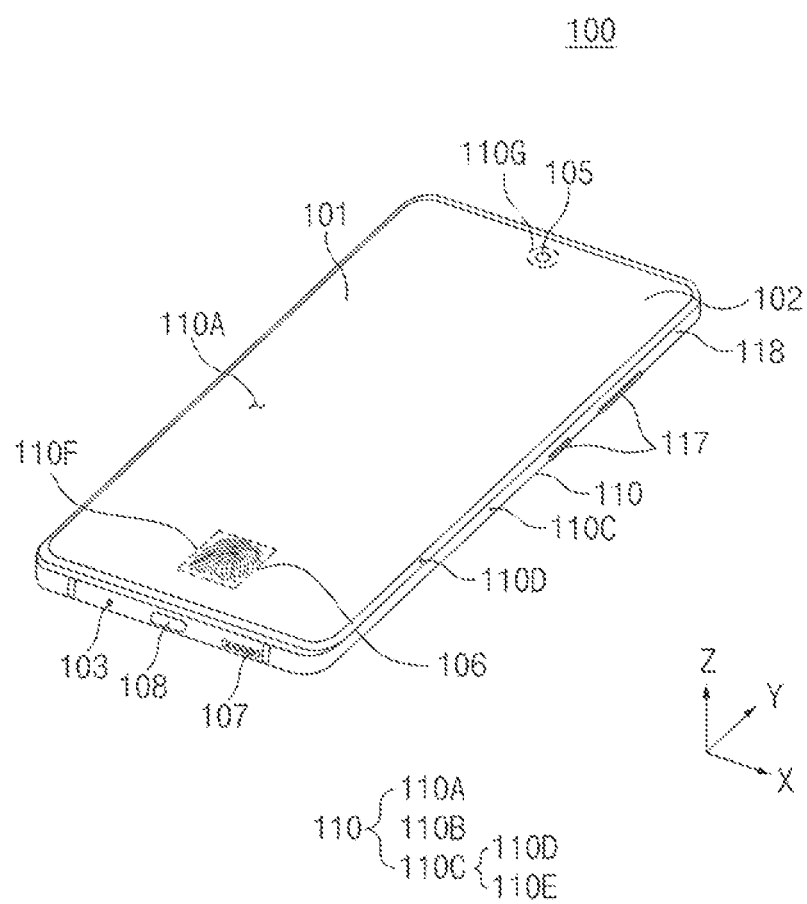
FIG. 1 is a front perspective view of an electronic device according to an embodiment.

Hereinafter, various embodiments of the disclosure will be described with reference to accompanying drawings. Accordingly, those of ordinary skill in the art will recognize that modification, equivalent, and/or alternative on the various embodiments described herein can be variously made without departing from the scope and spirit of the disclosure. With regard to description of the drawings, identical or similar reference numerals may be used to refer to identical or similar components.

According to the embodiments of the disclosure, the electronic device may provide aesthetics since the microphone hole for an audio input is not exposed outside the electronic device. Furthermore, the mounting region of the main PCB may be efficiently used. Moreover, the waterproof performance of the electronic device may be improved, and the sealing performance may be improved. Thus, the performance of the microphone may be improved.

In addition, the disclosure may provide various effects that are directly or indirectly recognized.

Figure 2:
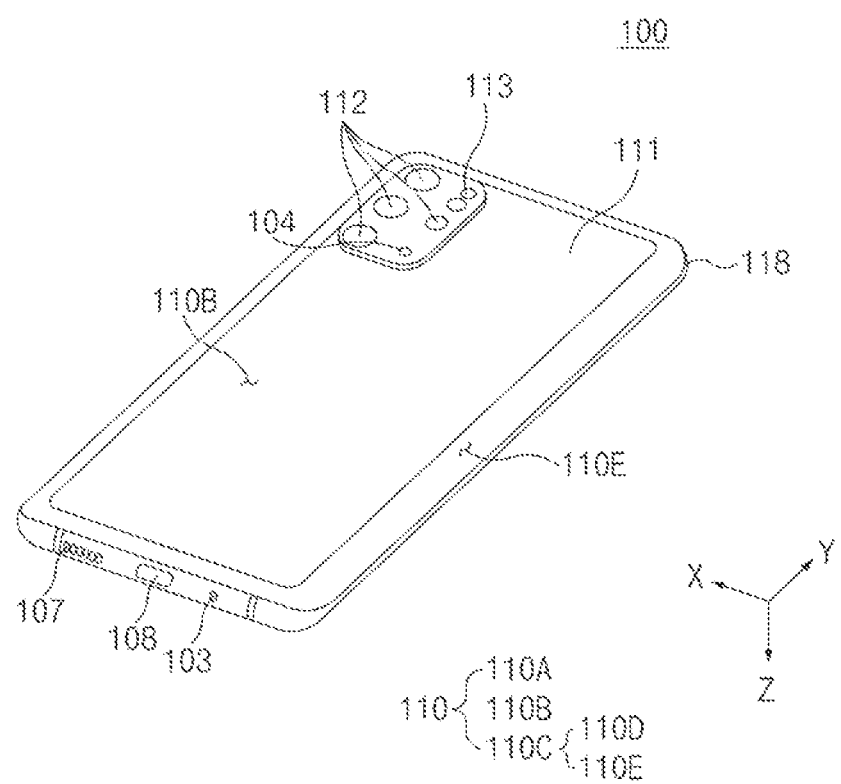
FIG. 2 is a rear perspective view of the electronic device according to an embodiment.

FIG. 1 is a front perspective view of an electronic device 100 according to an embodiment. FIG. 2 is a rear perspective view of the electronic device 100 according to an embodiment.

Referring to FIG. 1 and to FIG. 2, the electronic device 100 may include a housing 110 that includes a first surface 110A (which may be referred to as "a front surface"), a second surface 110B (which may be referred to as a "rear surface"), and a side surface 110C surrounding a space between the first surface 110A and the second surface 110B.

In an embodiment, the housing 110 may refer to a structure that forms some but not necessarily all of the first surface 110A, the second surface 110B, and the side surface 110C.

In an embodiment, the first surface 110A may be formed by a front plate 102, at least a portion of which is substantially transparent (e.g., a glass plate including various coating layers, or a polymer plate). The second surface 110B may be formed by a back plate 111 that is substantially opaque. The back plate 111 may be formed of, for example, coated or colored glass, ceramic, a polymer, metal (e.g., aluminum, stainless steel (STS), or magnesium), or a combination of at least two of the aforementioned materials. The side surface 110C may be formed by a side bezel structure 118 (which may be referred to as a "frame structure") that is coupled with the front plate 102 and the back plate 111 and that includes any of a metal and a polymer.

In another embodiment, the back plate 111 and the side bezel structure 118 may be integrally formed with each other and may include the same material (e.g., a metallic material such as aluminum).

In an embodiment, the front plate 102 may include first regions 110D that curvedly and seamlessly extend from partial regions of the first surface 110A and toward the back plate 111. The first regions 110D may be located at opposite long edges of the front plate 102.

In an embodiment, the back plate 111 may include second regions 110E that curvedly and seamlessly extend from partial regions of the second surface 110B and toward the front plate 102. The second regions 110E may be located at opposite long edges of the back plate 111.

In an embodiment, the front plate 102 may include only one of the first regions 110D, and the back plate 111 may include only one of the second regions 110E. Furthermore, in an embodiment, the front plate 102 may not include a part of the first regions 110D, and the back plate 111 may not include a part of the second regions 110E.

In an embodiment, when viewed from a side of the electronic device 100, the side bezel structure 118 may have a first thickness (which may be referred to as a "width") at sides (e.g., short sides) not including the first regions 110D or the second regions 110E and may have a second thickness at sides (e.g., long sides) including the first regions 110D or the second regions 110E, the second thickness being smaller than the first thickness.

In an embodiment, the electronic device 100 may include at least one of a display 101, audio module 103, the audio module 104, and the audio module 107 (e.g., an audio module 1270 of FIG. 12), a sensor module (e.g., a sensor module 1276 of FIG. 12), a first camera module 105 and a second camera module 112 (e.g., a camera module 1280 of FIG. 12), key input devices 117 (e.g., an input device 1250 of FIG. 12), a light emitting element, and a connector hole 108. In another embodiment, the electronic device 100 may omit at least one component (e.g., the key input devices 117 or the light emitting element) among the aforementioned components, and may additionally include other components.

In an embodiment, the display 101 may be exposed through at least a portion of the front plate 102. For example, at least a portion of the display 101 may be exposed through the front plate 102 that includes the first surface 110A and the first regions 110D of the side surfaces 110C.

In an embodiment, the shape of the display 101 may be formed to be substantially the same as the shape of the adjacent outside edge of the front plate 102. In an embodiment, to expand the area by which the display 101 is exposed, the gap between the periphery of the display 101 and the periphery of the front plate 102 may be formed to be substantially constant.

In an embodiment, a surface of the housing 110 (such as the front plate 102) may include a display area through which the display 101 is visually exposed and on which contents are displayed through pixels. For example, the display area may include the first surface 110A and the first regions 110D of the side surface.

In an embodiment, the display 101 may include, or may be disposed adjacent to, any of touch detection circuitry, a pressure sensor capable of measuring the intensity (pressure) of a touch, and a digitizer for detecting a stylus pen of a magnetic field type.

In an embodiment, the audio module 103, the audio module 104, and the audio module 107 may include the microphone hole 103 and the microphone hole 104 and the speaker hole 107.

In an embodiment, the microphone hole 103 and the microphone hole 104 may include the microphone hole 103 formed in a partial region of the side surface 110C and the microphone hole 104 formed in a partial region of the second surface 110B. Microphones for obtaining external sounds may be disposed in the housing 110 to correspond to the microphone holes 103 and 104. The microphones may include a plurality of microphones to detect the direction of sound. In an embodiment, the microphone hole 104 formed in the partial region of the second surface 110B may be disposed adjacent to the first camera module 105 and the second camera module 112. For example, the microphone hole 104 may obtain sounds when the first camera module 105 and the second camera module 112 are executed, or may obtain sounds when other functions are executed.

In an embodiment, the speaker hole 107 may include a receiver hole for telephone call. The speaker hole 107 may be formed in a portion of the side surface 110C of the electronic device 100. In an embodiment, the speaker hole 107, together with the microphone hole 103, may be implemented as a single hole. The receiver hole for telephone call may be formed in another portion of the side surface 110C. For example, the receiver hole for telephone call may be formed in another portion (e.g., a portion facing in the +Y-axis direction) of the side surface 110C that faces the portion (e.g., a portion facing in the −Y-axis direction) of the side surface 110C in which the speaker hole 107 is formed.

In an embodiment, the electronic device 100 may include a speaker fluidly connected with the speaker hole 107. In an embodiment, the speaker may include a piezoelectric speaker that does not include the speaker hole 107.

In an embodiment, the sensor module (e.g., the sensor module 1276 of FIG. 12) may generate an electrical signal or a data value that corresponds to an operational state inside the electronic device 100 or an environmental state external to the electronic device 100. In an embodiment, the sensor module may be disposed on at least a part of the first surface 110A, the second surface 110B, or the side surface 110C (e.g., any of the first regions 110D and the second regions 110E) of the housing 110 and may be disposed (e.g., a fingerprint sensor) on a rear surface of the display 101. For example, at least a portion of the sensor module may be disposed under the screen display area 110A and the housing 110 and may not be visually exposed, and a sensing region may be formed in at least a portion of the screen display area 110A and the first regions 110D. For example, the sensor module may include an optical fingerprint sensor. In some embodiments, the fingerprint sensor may be disposed on the second surface 110B as well as the first surface 110A of the housing 110 (e.g., the screen display area 110A and the first regions 110D). For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the key input devices 117 may be disposed on the side surface 110C (e.g., any of the first regions 110D and the second regions 110E) of the housing 110. In another embodiment, the electronic device 100 may not include all or some of the key input devices 117, and the key input devices 117 not included may be implemented in a different form, such as a soft key, on the display 101. In another embodiment, the key input devices may include a sensor module that forms the sensing region (not illustrated) that is included in the display area 110A and the first regions 110D.

In an embodiment, the connector hole 108 may accommodate a connector. The connector hole 108 may be disposed in the side surface 110C of the housing 110. For example, the connector hole 108 may be disposed in the side surface 110C so as to be adjacent to at least a part of the audio modules (e.g., the microphone hole 103 and the speaker hole 107). In another embodiment, the electronic device 100 may include the first connector hole 108 capable of accommodating a connector (e.g., a USB connector) for transmitting/receiving power and/or data with an external electronic device, and/or a second connector hole capable of accommodating a connector (e.g., an earphone jack) for transmitting/receiving an audio signal with an external electronic device.

In an embodiment, the electronic device 100 may include the light emitting element. For example, the light emitting element may be disposed on the first surface 110A of the housing 110. The light emitting element may provide state information of the electronic device 100 in the form of light. In another embodiment, the light emitting element may provide a light source that operates in conjunction with operation of the first camera module 105. For example, the light emitting element may include any of an LED, an IR LED, and a xenon lamp.

In an embodiment, the camera module 105 and the second camera module 112 may include any of the first camera module 105 (e.g., an under display camera) configured to receive light through a camera region of the first surface 110A of the electronic device 100, the second camera module 112 exposed on the second surface 110B, and a flash 113.

In an embodiment, the first camera module 105 may be disposed on the rear surface of the display 130. For example, the first camera module 105 may be coupled to some layers of the display 130, or may be located in an inner structure of the housing 110 such that an optical axis of a lens (e.g., an optical axis L of FIG. 3) is aligned with the camera region 106.

In an embodiment, the first camera module 105 may receive light through the camera region 106 formed in at least a portion of the first display area 110A and the first regions 110D. At least a portion of the camera region 106 may be included in the display area 110A and the first regions 110D. When the camera region 106 is included in the display area 110A and 110D, this may mean that at least a portion of the camera region 106 overlaps the display area 110A and the first regions 110D. For example, when the first camera module 105 does not operate, the camera region 106 may display contents like the other regions of the display area. For example, the camera region 106 may be a region that does not display contents when the first camera module 105 operates and through which light incident to the first camera module 105 passes.

In an embodiment, an optical signal input through the camera region 106 may pass through a pixel array of the flexible display 130 and the lens of the first camera module 105 and may be received by an image sensor of the first camera module 105. For example, the first camera module 105 may include an under display camera (UDC).

In an embodiment, the second camera module 112 may include a plurality of camera modules (e.g., any of a dual camera, a triple camera, and a quad camera). However, the second camera module 112 is not necessarily limited to including the plurality of camera modules and may include one camera module.

Any of the first camera module 105 and the second camera module 112 may include any of one or more lenses, an image sensor, and an image signal processor. The flash 113 may include, for example, any of a light emitting diode and a xenon lamp. In an embodiment, two or more lenses (an infrared camera lens, a wide angle lens, and a telephoto lens) and image sensors may be disposed in the housing to face in a direction in which one surface (e.g., the second surface 110B) of the electronic device 100 faces.

Figure 3:
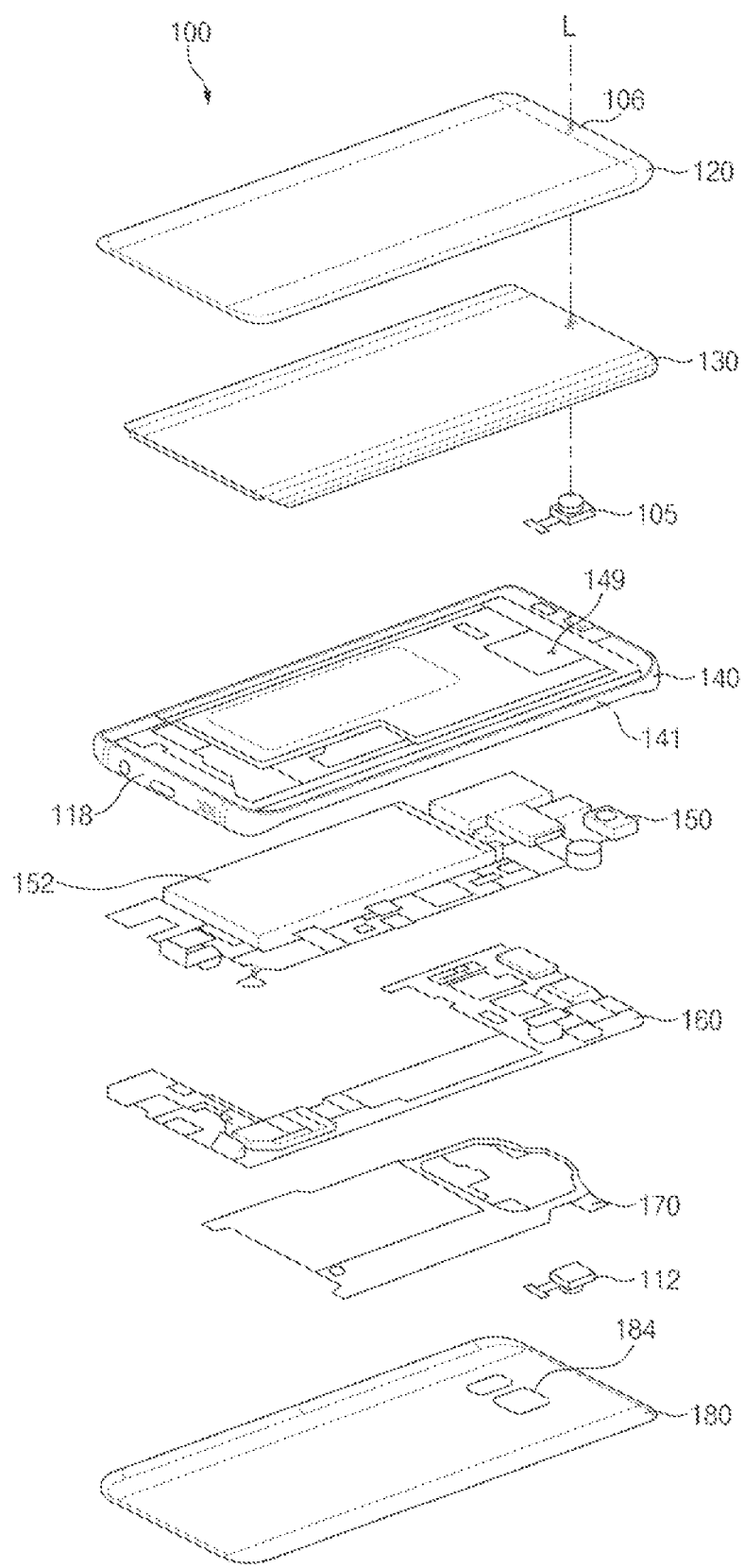
FIG. 3 is an exploded perspective view of an electronic device according to an embodiment.

FIG. 3 is an exploded perspective view of an electronic device 100 according to an embodiment.

Referring to FIG. 3, the electronic device 100 may include a side bezel structure 118, a first support member 140 (e.g., a bracket), a front plate 120, a display 130, a printed circuit board 150 (e.g., a printed circuit board (PCB), a flexible PCB (FPCB), or a rigid-flexible PCB (RFPCB)), a battery 152, a second support member 160 (e.g., a rear case), an antenna 170, and a back plate 180. In some embodiments, the electronic device 100 may not include at least one component (e.g., any of the first support member 140 and the second support member 160) among the aforementioned components, or may additionally include other component(s). At least one of the components of the electronic device 100 may be identical or similar to at least one of the components of the electronic device 100 of any of FIG. 1 and FIG. 2, and repetitive descriptions will hereinafter be omitted.

In an embodiment, the first support member 140 may be disposed inside the electronic device 100 and may be connected with the side bezel structure 118 or may be integrally formed with the side bezel structure 118. The first support member 140 may be formed of, for example, any of a metallic material and a non-metallic (e.g., polymer) material. The display 130 may be coupled to, or located on, one surface of the first support member 140, and the printed circuit board 150 may be coupled to, or located on, an opposite surface of the first support member 140.

In an embodiment, any of a processor, a memory, and an interface may be disposed on the printed circuit board 150. The processor may include, for example, one or more of a central processing unit, an application processor, a graphic processing unit, an image signal processor, a sensor hub processor, or a communication processor.

In an embodiment, the memory may include, for example, any of a volatile memory and a non-volatile memory.

In an embodiment, the interface may include, for example, any of a high definition multimedia interface (HDMI), a universal serial bus (USB) interface, a secure digital (SD) card interface, and an audio interface. For example, the interface may electrically or physically connect the electronic device 100 with an external electronic device and may include a USB connector, an SD card/MMC connector, and an audio connector.

In an embodiment, the battery 152, which is a device for supplying power to at least one component of the electronic device 100, may include, for example, any of a primary cell that is not rechargeable, a secondary cell that is rechargeable, and a fuel cell. At least a portion of the battery 152, for example, may be disposed on substantially the same plane as the printed circuit board 150. The battery 152 may be integrally disposed inside the electronic device 100 or may be disposed so as to be detachable from the electronic device 100.

In an embodiment, the antenna 170 may be disposed between the back plate 180 and the battery 152. The antenna 170 may include, for example, any of a near field communication (NFC) antenna, a wireless charging antenna, and a magnetic secure transmission (MST) antenna. For example, the antenna 170 may perform short range communication with an external device or may wirelessly transmit and receive power required for charging. In another embodiment, an antenna structure may be formed by any of a portion of the side bezel structure 118, a portion of the first support member 140, and a combination thereof.

In an embodiment, a first camera module 105 may be coupled to a rear surface of the display 130 such that a camera region 106 is formed in the front plate 120. For example, at least a portion of the first camera module 105 may be disposed on the first support member 140. In an embodiment, at least a portion of the first camera module 105 may be located in an opening 149 formed in the first support member 140. For example, a lens of the first camera module 105 may be disposed to receive light passing through a pixel array included in the display 130, and the camera region 106 may at least partially overlap a display area on which contents are displayed. For example, an optical axis L of the first camera module 105 may pass through at least a partial region of the display. For example, at least the partial region may include a pixel array.

In an embodiment, a second camera module 112 may be disposed such that a lens is exposed through a second camera region 184 of the back plate 180 (e.g., the rear surface 110B of FIG. 2) of the electronic device 100. The second camera region 184 may be formed in at least a portion of a surface of the back plate 180 (e.g., the rear surface 110B of FIG. 2). In an embodiment, the second camera region 184 may be at least partially transparent such that external light is incident to the lens of the second camera module 112.

In an embodiment, at least a portion of the second camera region 184 may protrude from the surface of the back plate 180 to a predetermined height. However, without being necessarily limited thereto, the second camera region 184 may form substantially the same plane as the surface of the back plate 180.

Figure 4:
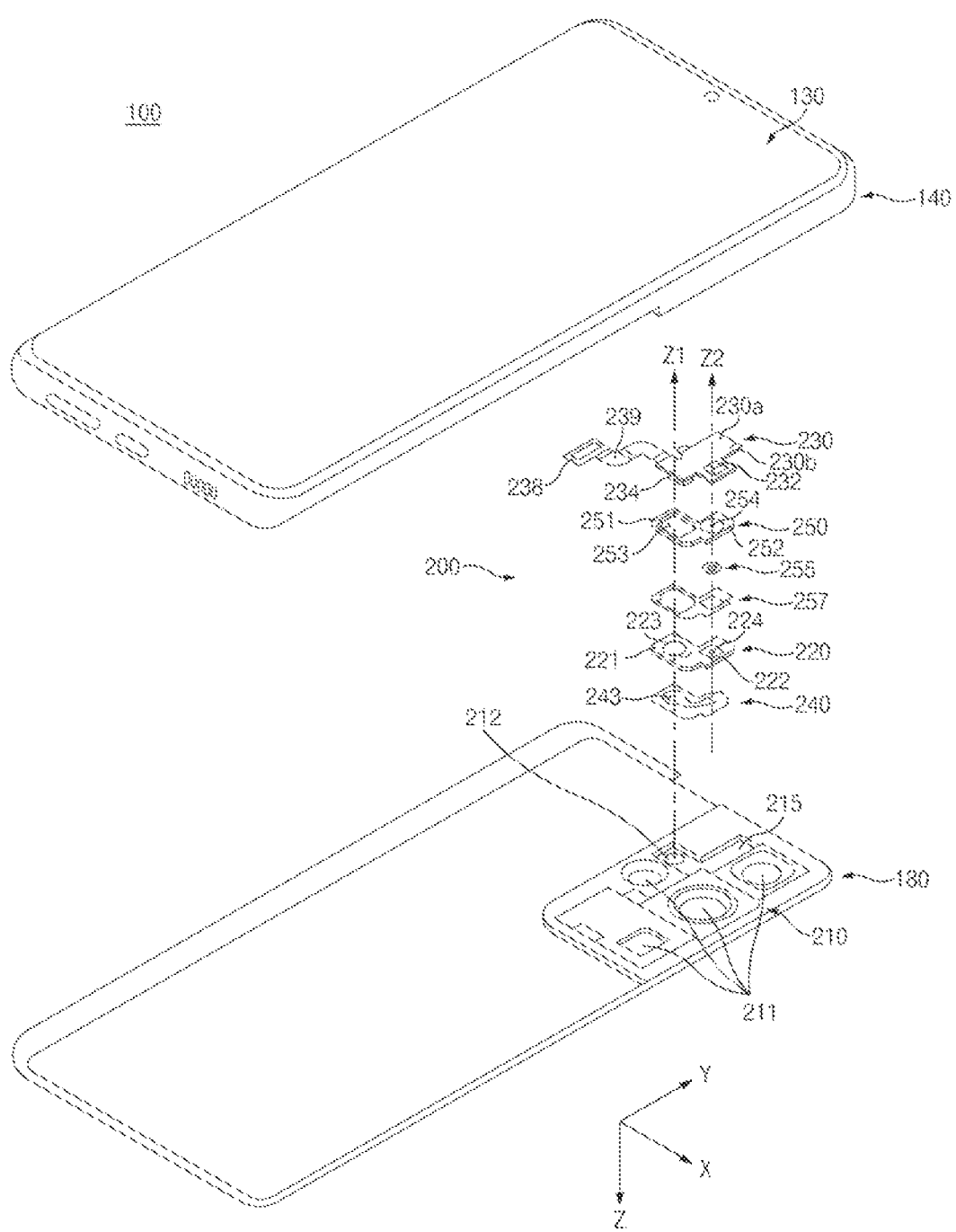
FIG. 4 is a view illustrating a microphone module of an electronic device according to an embodiment.

FIG. 4 is a view illustrating a microphone module 200 of an electronic device 100 according to an embodiment.

Referring to FIG. 4, the electronic device 100 may include a display 130, a side member 140, a back cover 180, and the microphone module 200.

In an embodiment, the display 130, the side member 140, and the back cover 180 may form a housing of the electronic device 100 (e.g., the housing 110 of FIG. 1). The display 130 may form a front surface of the electronic device 100, and the back cover 180 may form a rear surface of the electronic device 100. The side member 140 may surround a space between the display 130 and the back cover 180. The side member 140 may be connected to the periphery of the display 130 and the periphery of the back cover 180. Various parts may be disposed in the space surrounded by the side member 140. For example, the microphone module 200 may be disposed in the space.

In an embodiment, the back cover 180 may include a decorative member 210. A camera module (e.g., the second camera region 184 of FIG. 3) and the microphone module 200 may be coupled to the decorative member 210. For example, a first opening 211 aligned with a lens of the camera module may be formed in the decorative member 210. The camera module may receive, through the first opening 211, external light reflected or discharged from an object.

In an embodiment, the decorative member 210 may have a second opening 212 formed therein in which a first part 221 of a flash window 200 is located. In various embodiments, the first part 221 may be formed to protrude so as to be at least partially accommodated in the second opening 212. Light emitted from a flash element 234 may be sent out from the electronic device through the first part 221 of the flash window 220 located in the second opening 212. The flash window 220 may be formed to be at least partially transparent.

In an embodiment, a recess 215 in which the flash window 220 is seated may be formed on the decorative member 210. The recess 215 may be formed in a shape substantially corresponding to the flash window 220 and may be depressed in the Z-axis direction. An adhesive member 240 for attaching the flash window 220 may be disposed on a bottom surface of the recess 215.

In an embodiment, the microphone module 200 may include a microphone substrate 230, a microphone bracket 250, a waterproof member 255, a sealing member 257, the flash window 220, and the adhesive member 240.

In an embodiment, the microphone substrate 230 may be electrically connected to a printed circuit board of the electronic device 100 (e.g., the printed circuit board 150 of FIG. 3) through a connecting member 239. The connecting member 239 may be integrally formed with the microphone substrate 230, or may include a separate FPCB. For example, the connecting member 239 may include a region flexibly extending from the microphone substrate 230. The connecting member 239 may include a connector 238 coupled to the printed circuit board of the electronic device 100 (e.g., the printed circuit board 150 of FIG. 3).

In an embodiment, a microphone element 232 and the flash element 234 may be disposed on the microphone substrate 230. The flash element 234 may be disposed to be at least partially aligned with the second opening 212 in a Z1-axis direction. The microphone element 232 may be disposed to be at least partially aligned with the waterproof member 255 and a microphone hole 224 of the flash window 220 in a Z2-axis direction. In an embodiment, the microphone element 232 may be disposed on a first surface 230a (e.g., a surface facing in the Z-axis direction) of the microphone substrate 230, and the flash element 234 may be disposed on a second surface 230b (e.g., a surface facing in the −Z-axis direction) of the microphone substrate 230. In various embodiments, the flash element 234 may be referred to as the flash 113 of FIG. 2.

In an embodiment, the adhesive member 240 may attach the flash window 220 to the decorative member 210. An opening region 243 may be defined in the adhesive member 240. The adhesive member 240 may be formed in the form of a closed curve surrounding the opening region 243. The opening region 243 of the adhesive member 240 may be formed to overlap the second opening 212 of the decorative member 210, the microphone hole 224 of the flash window 220, and a second microphone hole 254 of the bracket 250 when viewed in the Z-axis direction. For example, the opening region 243 may be aligned with the second opening 212 and the flash element 234 when viewed in the Z1-axis direction. The opening region 243 may be aligned with the microphone hole 224, the second microphone hole 254, and the microphone element 232 when viewed in the Z2-axis direction. In various embodiments, the second opening 212 may be referred to as the second microphone hole 104 of FIG. 2.

In an embodiment, the flash window 220 may be disposed between the recess 215 of the decorative member 210 and the microphone substrate 230. The flash window 220 may include the first part 221 at least partially facing the flash element 234 and a second part 222 at least partially facing the microphone element 232. For example, the first part 221 may be aligned with the flash element 234 on the microphone substrate 230 in the Z1-axis direction, and the second part 222 may be aligned with the microphone element 232 on the microphone substrate 230 in the Z2-axis direction. Light emitted from the flash element 234 may be sent out from the electronic device 100 through the first part 221 and the second opening 212. In an embodiment, the first part 221 may include a protruding portion 223 accommodated in the second opening 212. In an embodiment, when viewed in the Z-axis direction, the first part 221 and the second part 222 of the flash window 220 may be at least partially surrounded by the opening region 243 of the adhesive member 240. In an embodiment, the microphone hole 224 may be formed in the second part 222 of the flash window 220. The microphone hole 224 may be aligned with the second microphone hole 254 of the bracket 250 in the Z2-axis direction. In an embodiment, the microphone hole 224, together with the second microphone hole 254, may form an audio input path along which an external audio signal introduced through the second opening 212 proceeds.

In an embodiment, the bracket 250 may be disposed on the second surface 230b of the microphone substrate 230. The bracket 250 may be configured to support the waterproof member 255. The bracket 250 may include a third part 251 aligned with the first part 221 of the flash window 220 in the Z1-axis direction and a fourth part 252 aligned with the second part 222 of the flash window 220 in the Z2-axis direction. In an embodiment, a second opening region 253 through which light emitted from the flash element 234 passes may be formed in the third part 251 of the bracket 250. In an embodiment, the second microphone hole 254 fluidly connected with the microphone hole 224 may be formed in the fourth part 252 of the bracket 250. The waterproof member 255 may be disposed between the second microphone hole 254 of the bracket 250 and the microphone hole 224 of the flash window 220. In an embodiment, the waterproof member 255 may be configured to prevent introduction of moisture into the microphone element 232 through the second microphone hole 254. In an embodiment, the waterproof member 255 may be configured such that air flows between the second microphone hole 254 and the microphone element 224. For example, since an audio signal passing through the microphone hole 224 is a sound wave with air as a medium, the audio signal may pass through the waterproof member 255 and may proceed to the microphone element 232 through the second microphone hole 254.

In an embodiment, the sealing member 257 may be disposed between the flash window 220 and the bracket 250. The sealing member 257 may be formed to surround the microphone hole 224 of the flash window 220 and the second microphone hole 254 of the bracket 250 when viewed in the Z-axis direction. The sealing member 257 may seal the audio input path formed by the microphone hole 224 and the second microphone hole 254 and may reduce noise introduced into the microphone element 232.

In various embodiments, the sealing member 257 may include a second adhesive member 240 that attaches the bracket 250 and the flash window 220 and is capable of sealing the audio input path. In this case, the second adhesive member 240 may extend along the periphery of the flash window 220 and the periphery of the bracket 250. For example, the second adhesive member 240 may be formed to surround the second opening region 253 of the bracket 250 when viewed in the Z1-axis direction and may be formed to surround the waterproof member 255, the microphone hole 224 of the flash window 220, and the second microphone hole 254 of the bracket 250 when viewed in the Z2-axis direction.

Figure 5:
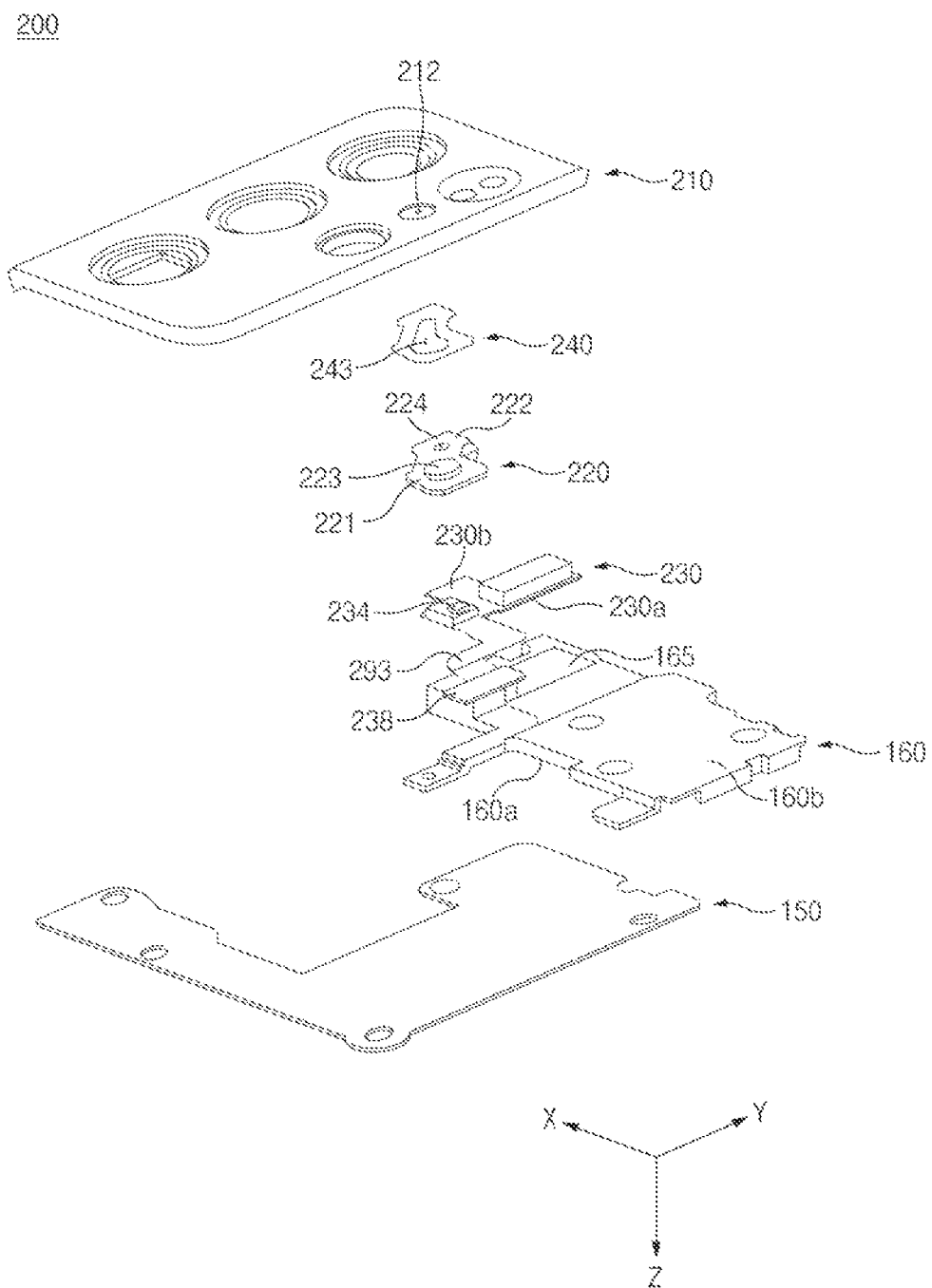
FIG. 5 is a view illustrating the microphone module of the electronic device according to various embodiments.

FIG. 5 is a view illustrating the microphone module 200 of the electronic device according to various embodiments.

Referring to FIG. 5, the electronic device 100 may further include a rear case 160. The rear case 160 may be formed of various materials. For example, the rear case may include any of a metallic material and a polymer material. In an embodiment, the rear case 160 may support an inner structure of the electronic device 100. For example, a printed circuit board 150 and the microphone substrate 230 may be disposed on the rear case 160. The printed circuit board 150 may be disposed on a front surface 160a of the rear case 160, and the microphone substrate 230 may be disposed on a rear surface 160b of the rear case 160. For example, a region 165 on which the microphone substrate 230 is disposed may be formed on the rear surface 160b of the rear case 160. In various embodiments, an antenna pattern may be formed on the rear case 160. In various embodiments, a waterproof member of the microphone module 200 (e.g., the waterproof member 255 of FIG. 4) may be disposed on the rear case 160. For example, the rear case 160 may replace the bracket 250 illustrated in FIG. 4.

In an embodiment, the microphone substrate 230 may be electrically connected with the printed circuit board 150 through the connecting member 239 extending toward the printed circuit board 150. The first surface 230a of the microphone substrate 230 may at least partially make contact with the rear surface of the rear case 160. The second surface 230b of the microphone substrate 230 may at least partially face the flash window 220 and the decorative member 210. The flash element 234 may be disposed on the second surface 230b of the microphone substrate 230.

In an embodiment, the first part 221 of the flash window 220 may include the protruding portion 223 accommodated in the second opening 212 of the decorative member 210. The protruding portion 223 may be formed to be smaller than the second opening 212. For example, when viewed in the Z-axis direction, a gap g, such as labeled in FIG. 6A and FIG. 7, may be formed between the protruding portion 223 and the second opening 212. The gap g may form a path along which an external audio signal is introduced.

In an embodiment, the adhesive member 240 may be formed such that the protruding portion 223 and the microphone hole 224 are located in the opening region 243. For example, the adhesive member 240 may extend to at least partially surround the protruding portion 223 of the flash window 220 and surround the microphone hole 224. For example, the adhesive member 240 may extend along a region of the first part 221 of the flash window 220 around the protruding portion 223.

Figure 6A:
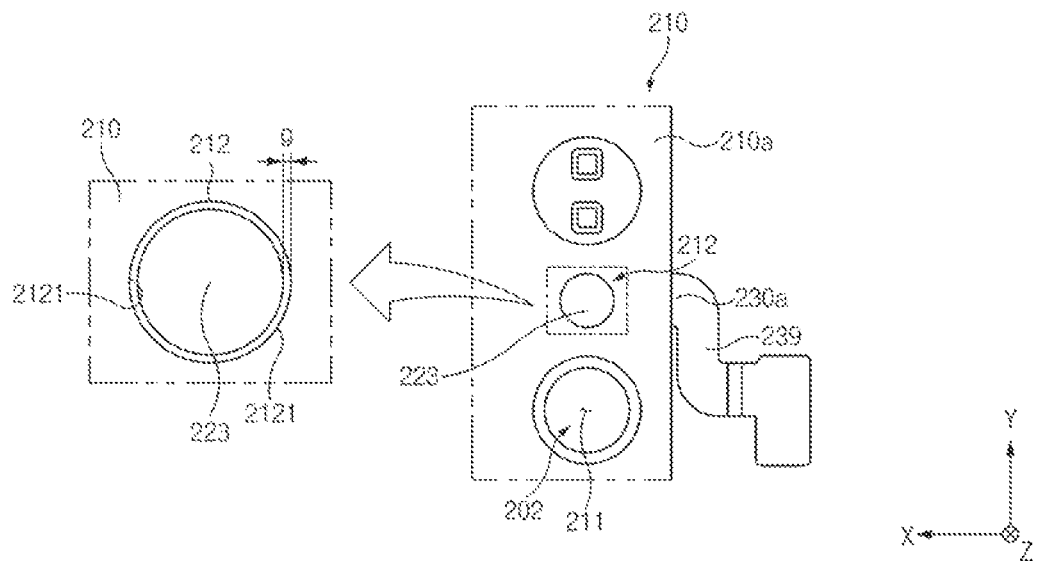
FIG. 6A is a plan view of the microphone module of the electronic device according to an embodiment.
Figure 6B:
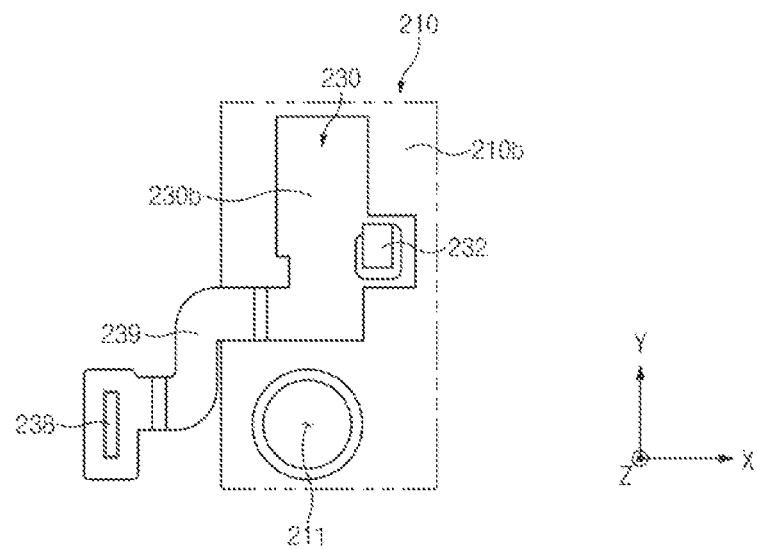
FIG. 6B is a rear view of the microphone module of the electronic device according to an embodiment.

FIG. 6A is a plan view of the microphone module 200 of the electronic device according to an embodiment. FIG. 6A is a view of the microphone module 200 as viewed in the Z-axis direction. FIG. 6B is a view of the microphone module 200 as viewed in the −Z-axis direction.

Referring to FIG. 6A, when the decorative member 210 is viewed from above, the protruding portion 223 of the first part 221 of the flash window 220 may form a portion of a first surface 210a of the decorative member 210. The first surface 210a, together with the back cover 180, may form a portion of the rear surface of the electronic device 100. In an embodiment, the connecting member 239 may extend to the outside of the decorative member 210.

In an embodiment, the protruding portion 223 of the flash window 220 may be at least partially accommodated in the second opening 212. The protruding portion 223 of the flash window 220 may be formed in a size smaller than that of the second opening 212. For example, when viewed in the Z-axis direction, the area occupied by the protruding portion 223 may be smaller than the area of the second opening 212. Due to the size difference, a gap may be formed between the protruding portion 223 of the flash window 220 and an inner wall 2121 of the second opening 212.

Referring to FIG. 6A, the first opening 211 aligned with a lens of a camera module 202 (e.g., such as any of the second camera module 112 of FIG. 3 and the camera module 1280 of FIG. 12) may be formed in the decorative member 210, and the second opening 212 may be formed in a position adjacent to the first opening 211. The camera module 202 may receive light reflected or emitted from an object through the lens exposed through the second opening 212. The microphone element 232 may receive an audio signal through the gap g between the protruding portion 223 and the inner wall 2121 of the second opening 212. Accordingly, the microphone element 232 may receive an audio signal generated from the direction in which the object is located. For example, when a video is recorded, a video signal taken by the camera module 202 and a voice signal recorded by the microphone element 232 may be input from substantially the same direction.

Referring to FIG. 6B, the microphone substrate 230 may be coupled to a second surface 210b of the decorative member 210. For example, the microphone substrate 230 may be attached to the decorative member 210 through the adhesive member 240 disposed between the second surface 230b of the microphone substrate 230 and the second surface 210b of the decorative member 210. The microphone element 232 may be disposed on the second surface 230b of the microphone substrate 230.

Figure 7:
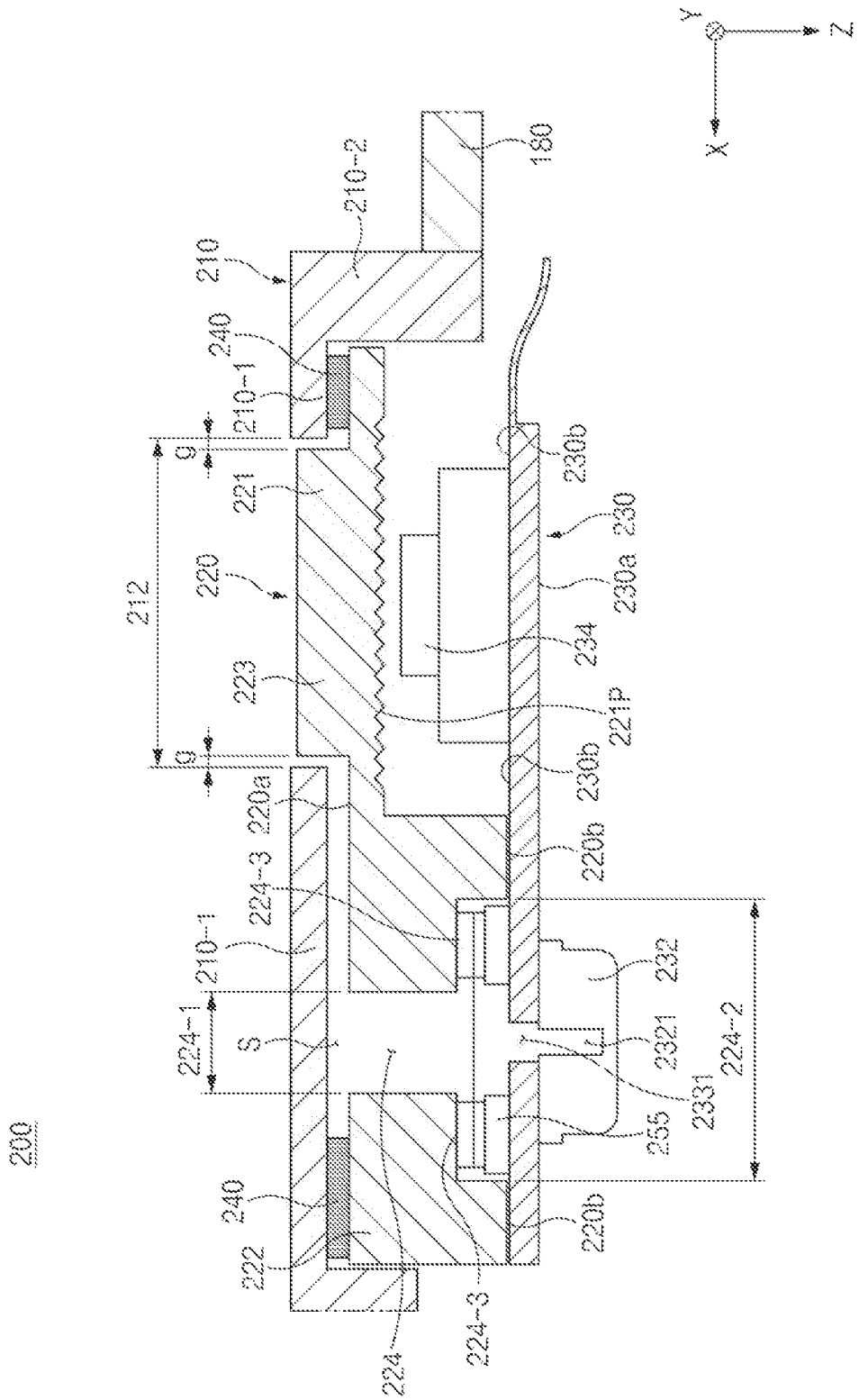
FIG. 7 is a view illustrating an audio input path of the microphone module of the electronic device according to an embodiment.

FIG. 7 is a view illustrating an audio input path of the microphone module of the electronic device according to an embodiment. FIG. 7 is a sectional view taken along line A-A of FIG. 6A.

Referring to FIG. 7, the decorative member 210 may be coupled to the back cover 180. For example, the decorative member 210 may form the rear surface of the electronic device 100 together with the back cover 180. The decorative member 210 may protrude to a predetermined height from the back cover 180. However, the form of the decorative member 210 is not so limited. For example, the decorative member 210 may form substantially the same plane as the back cover 180. For example, the decorative member 210 may be integrally formed with the back cover 180, and may be referred to as a partial region of the back cover 180 (e.g., a camera region 281 of FIG. 10). However, the decorative member 210 and the back cover 180 are not limited to forming the same plane, and the decorative member 210 may be depressed with respect to the back cover 180, or may protrude above from the back cover 180.

In an embodiment, the decorative member 210 may be formed to at least partially surround the microphone module 200. For example, referring to the drawing, the decorative member 210 may partially surround a portion of the flash window 220.

In an embodiment, the decorative member 210 may include a first region 210-1 facing the second surface 130b of the microphone substrate 230 in the Z-axis direction and a second region 210-2 extending from the first region 210-1 in the Z-axis direction. The first region 210-1 may face an upper surface 220a of the flash window 220. The adhesive member may be disposed on the first region 210-1, and the first region 210-1 may be coupled with the upper surface 220a of the flash window 220 through the adhesive member 240. The second region 210-2 may surround a side surface of the flash window 220.

In an embodiment, the first region 210-1 of the decorative member 210 may be at least partially spaced apart from the upper surface 220a of the flash window 220. Referring to FIG. 7, a space between the first region 210-1 and the upper surface 220a may be defined as a space S. Referring to FIG. 7, the space S may include a space surrounded by the upper surface 220a of the flash window 220, the first region 210-1 of the decorative member 210, and the adhesive member 240. The space S may form a portion of the audio input path of the electronic device 100. In an embodiment, the space S may be fluidly connected with the gap g between the protruding portion 223 of the flash window 220 and the inner wall of the second opening 212 of the decorative member 210 such that sound waves are transmitted. To be fluidly connected indicates that a sound wave may propagate through a fluid, such any of air and any other gases and liquids, providing such connection. For example, the space S and the gap g may form one connected space through which air passes, and vibration (sound waves) of air caused by an external audio signal may be propagated to the space S through the gap g.

In an embodiment, the flash window 220 may be disposed between the decorative member 210 and the microphone substrate 230. The upper surface 220a of the flash window 220 may be at least partially attached to the decorative member 210 through the adhesive member 240, and a lower surface 220b may be at least partially attached to the microphone substrate 230. In an embodiment, the first part 221 of the flash window 220 may be disposed between the flash element 234 and the decorative member 210, and the second part 222 of the flash window 220 may extend between the microphone element 232 and the decorative member 210 from the first part 221.

In an embodiment, the microphone hole 224 may be formed in the second part 222 of the flash window 220. The microphone hole 224 may penetrate the upper surface 220a and the lower surface 220b of the flash window 220. The microphone hole 224 may be aligned with a sound inlet of the microphone element 232 in the Z-axis direction. For example, a through-hole 2331 may be formed in the microphone substrate 230, and the microphone hole 224 may be aligned with the through-hole 2331 in the Z-axis direction.

In an embodiment, the microphone hole 224 and the space S may be fluidly connected such that sound waves are transmitted. Accordingly, an external audio signal may be propagated to the microphone element 232 through the gap g, the space S, and the sound inlet 2321.

According to an embodiment, the audio input path may include at least some of the gap, the space S, the microphone hole 224, the through-hole 2331, and the sound inlet 2321 of the microphone element 232.

In an embodiment, the microphone hole 224 may include a first hole portion 224-1 and a second hole portion 224-2 that have different sizes. Here, the sizes may mean the distances measured in the X-axis direction based on the drawing. For example, the first hole portion 224-1 may have a smaller size than the second hole portion 224-2. Referring to the drawing, the first hole portion 224-1 and the second hole portion 224-2 may form a stepped surface 224-3. The waterproof member 255 may be disposed on the stepped surface 224-3. The second hole portion 224-2 may include a portion closer to the second surface 230b of the microphone substrate 230 than the first hole portion 224-1. The first hole portion 224-1 may include a portion closer to the space S than the second hole portion 224-2.

In an embodiment, the waterproof member 255 may be disposed in the microphone hole 224 to prevent introduction of moisture into the sound inlet 2321 of the microphone element 232. For example, the waterproof member 255 may be at least partially disposed in the second hole portion 224-2 of the microphone hole 224. For example, the waterproof member 255 may be disposed on the stepped surface 224-3 in the microphone hole 224. In an embodiment, the waterproof member 255 may have various materials, structures, and shapes capable of transmitting vibration of air while blocking introduction of moisture. For example, the waterproof member 255 may include a membrane in the form of a thin film, and the membrane may vibrate in response to vibration of air included in the first hole portion 224-1. The vibrating membrane may vibrate air included in the sound inlet of the microphone element 232 and may transmit sound waves to the microphone element 232.

In an embodiment, the flash element 234 may be disposed on the second surface 230b of the microphone substrate 230. The flash element 234 may be disposed to be aligned with the protruding portion 223 of the first part 221 of the flash window 220 when viewed in the Z-axis direction. A space in which the flash element 234 is disposed may be formed in the first part 221 of the flash window 220. The flash window 220 may include a bumpy region for inducing diffuse reflection of light emitted from the flash element 234. The bumpy region 221P may include a region facing the flash element 234. The bumpy region 221P may be formed to be rough such that light emitted from the flash element 234 is able to spread in various directions.

Figure 8:
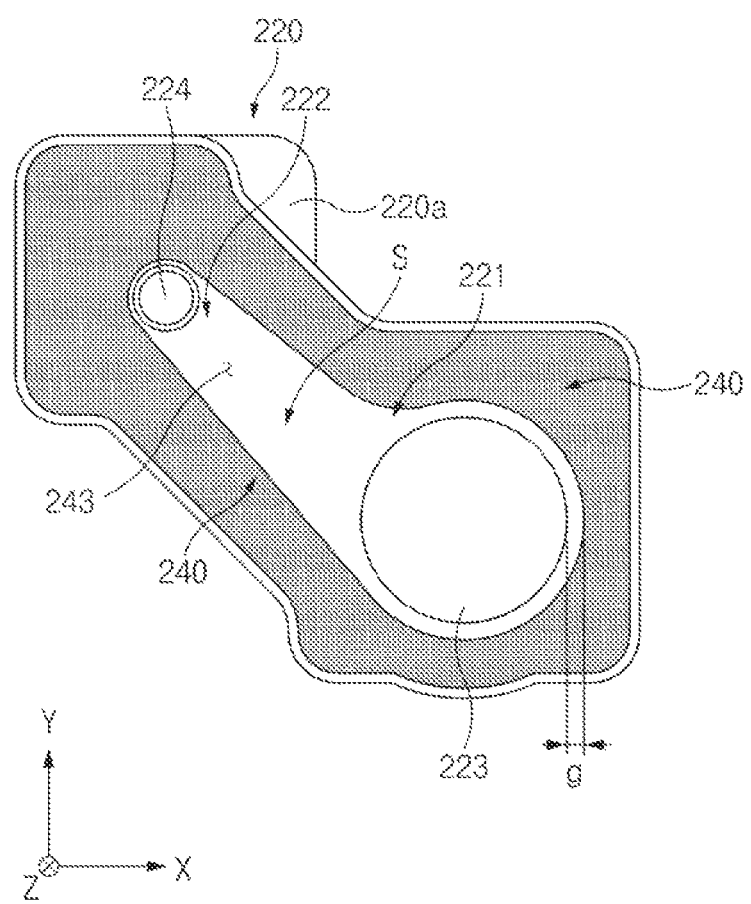
FIG. 8 is a view illustrating the audio input path of the microphone module of the electronic device according to an embodiment.

FIG. 8 is a view illustrating the audio input path of the microphone module 200 of the electronic device 100 according to an embodiment.

In an embodiment, the audio input path may include the gap g around the protruding portion 223 of the flash window 220, the microphone hole 224, and the space S fluidly connected with the gap g and the microphone hole 224 such that sound waves are transmitted.

Referring to FIG. 8, the space S may be surrounded by the upper surface 220a of the flash window 220 and the adhesive member 240. The adhesive member 240 may extend to the first part 221 and the second part 222 of the flash window 220 to surround the microphone hole 224 and the gap g. For example, the adhesive member 240, when viewed in the Z-axis direction, may be formed in a closed form that surrounds the region including the microphone hole 224 and the gap g. For example, at least a portion of the adhesive member 240 may extend along the periphery of the upper surface 220a of the flash window 220.

In an embodiment, the adhesive member 240, when viewed in the Z-axis direction, may be formed with a predetermined width to provide sufficient adhesive force and sufficient sealing. For example, the adhesive member 240 may be configured to attach the flash window 220 and the decorative member 210 and reduce noise introduced into the microphone element 232. In an embodiment, the adhesive member 240 may include a double-sided tape.

Figure 9:
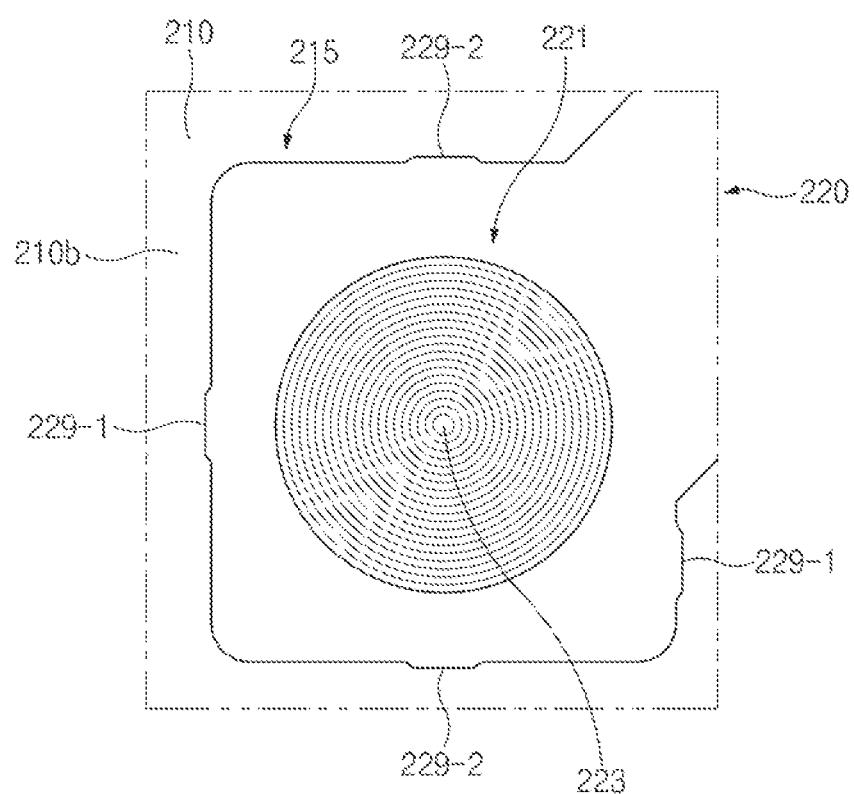
FIG. 9 is a view illustrating a flash window of the electronic device according to an embodiment.

FIG. 9 is a view illustrating the flash window 220 of the electronic device 100 according to an embodiment.

Referring to FIG. 9, the flash window 220 may be seated in a recess of the decorative member 210 (e.g., the recess 215 of FIG. 4). One or more protrusions 229 at least partially making contact with the inner wall of the recess 215 may be formed on the first part of the flash window 220. For example, the one or more protrusions 229 may protrude in the X-axis or Y-axis direction.

In an embodiment, the one or more protrusions 229 are not necessarily limited to being formed on the first part of the flash window 220. For example, the one or more protrusions 229 may be formed on another part of the flash window 220 (e.g., the second part 222 of FIG. 8).

In an embodiment, the one or more protrusions 229 may be supported on the inner wall of the recess 215 and may prevent the flash window 220 from moving in any of the X-axis direction and the Y-axis direction and rotating about the Z-axis. For example, the one or more protrusions 229 may be press-fit into the inner wall of the recess 215. For example, the one or more protrusions 229 may include a first protrusion 229-1 protruding in the X-axis direction and a second protrusion 229-2 protruding in the Y-axis direction.

Figure 10:
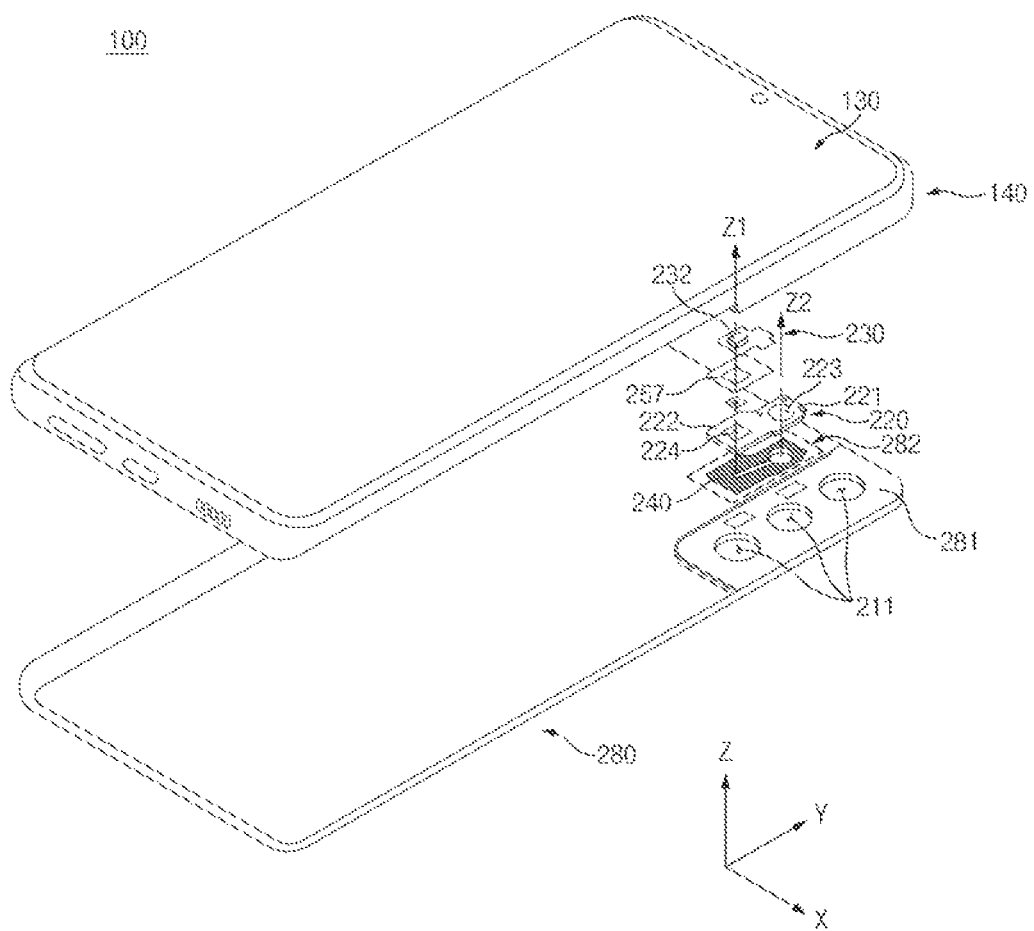
FIG. 10 is a view illustrating a microphone module of an electronic device according to various embodiments.

FIG. 10 is a view illustrating a microphone module of an electronic device according to various embodiments. FIG. 11 is a view illustrating the microphone module of the electronic device according to various embodiments.

In describing FIGS. 10 and 11, repetitive descriptions identical to ones given with reference to FIGS. 4 to 9 will be omitted.

Referring to FIG. 10, the electronic device 100 may include a display 130, a side member 140, a back cover 280, and the microphone module 200. The display 130 and the side member 140 are identical to those described with reference to FIG. 4, and therefore descriptions thereabout will be omitted.

In an embodiment, the back cover 280 may include a camera region 281 on which a camera module (e.g., the second camera module 112 of FIG. 3) is disposed and a microphone region 282 on which the microphone module 200 is disposed. The camera region 281 and the microphone region 282 may be formed as structures separate from the back cover 280 or may be integrally formed with the back cover 280. In an embodiment, a first opening 211 aligned with a lens included in the camera module may be formed in the camera region 281. The camera module may receive, through the first opening 211, external light of the electronic device 100 reflected or emitted from an object. In an embodiment, the microphone region 282 may have a second opening 212 formed therein into which a first part 221 of a flash window 220 is at least partially inserted. In various embodiments, the camera region 281 may be referred to as the decorative member 210 described with reference to any of FIG. 4, FIG. 5, FIG. 6A, FIG. 6B, FIG. 7, FIG. 8, and FIG. 9.

In an embodiment, the flash window 220 may be attached to the microphone region 282 of the back cover 280 through an adhesive member 240. The first part 221 of the flash window 220 may be aligned with the second opening 212 in the Z-axis direction, and a second part 222 of the flash window 220 may be aligned with a microphone element 232 of a microphone substrate 230 in the Z-axis direction. For example, a flash element 234 of the microphone substrate 230, the first part 221 of the flash window 220, and an opening region 243 of the adhesive member 240 may be aligned in a Z2-axis direction. For example, the microphone element 232 of the microphone substrate 2301, a second opening region surrounded by a sealing member 257, a waterproof member 255, a microphone hole 224 of the flash window 220, and the opening region 243 of the adhesive member 240 may be aligned in a Z1-axis direction.

In an embodiment, the adhesive member 240 may be disposed on the microphone region 282. The opening region 243 may be defined in the adhesive member 240. The adhesive member 240 may be formed in a closed form that surrounds the opening region 243. For example, the adhesive member 240, when viewed in the Z-axis direction, may extend in a form that at least partially surrounds the second opening 212 and extends to one side. In an embodiment, the opening region 243 may be formed such that one portion is aligned with the Z1-axis and another portion is aligned with the Z2-axis.

In an embodiment, an external audio signal may be propagated into the opening region through the second opening 212. The audio signal propagated into the opening region 243 may be propagated to the microphone element 232 through the microphone hole 224 of the flash window 220, the waterproof member 255, and the second opening of the sealing member 257.

Figure 11A:
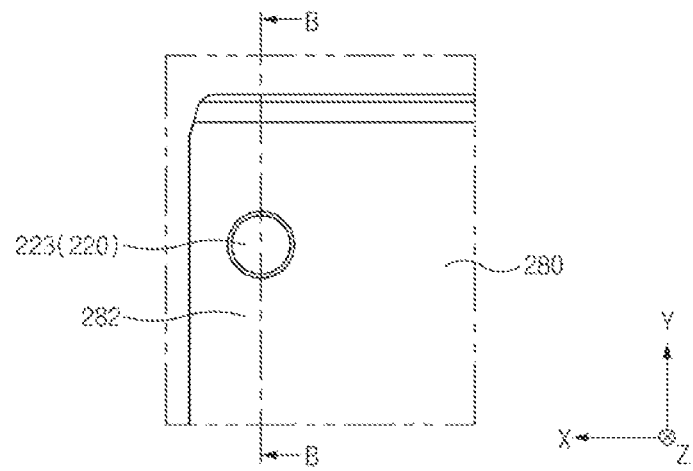
FIG. 11A is a view illustrating the microphone module of the electronic device according to various embodiments.
Figure 11B:
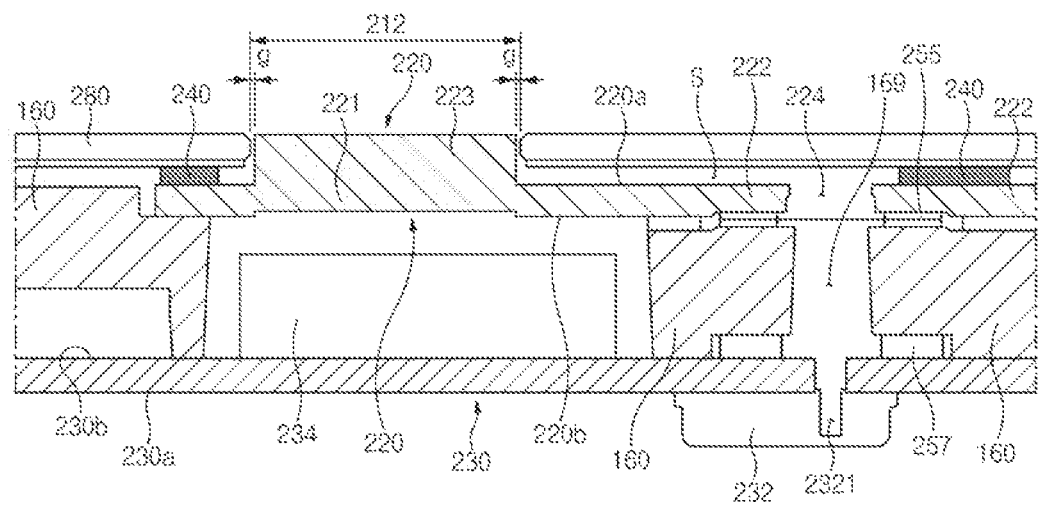
FIG. 11B is a view illustrating the microphone module of the electronic device according to various embodiments.

Referring to FIG. 11A and FIG. 11B, the first part 221 of the flash window 220 may include a protruding portion 223 at least partially accommodated in the second opening 212. In this case, the protruding portion 223 may form substantially the same plane as the back cover 280. The protruding portion 223 may be formed at least partially smaller than the second opening 212 so as to have a predetermined gap from an inner wall of the second opening 212.

In an embodiment, an upper surface 220a of the flash window 220 and the back cover 280 may be coupled through the adhesive member 240 so as to be spaced apart from each other by a predetermined gap. A space S may be formed between the flash window 220 and the back cover 280.

In an embodiment, the space S may be fluidly connected with the gap g and the microphone hole 224 such that sound waves are transmitted. For example, the space S, the gap g, and the microphone hole 224 may be formed as one connected space such that vibration of air is transmitted.

Referring to FIG. 11B, a rear case 160 may be disposed between the flash window 220 and the microphone substrate 230. The rear case 160 may be at least partially coupled to a second surface 230b of the microphone substrate 230 and a lower surface 220b of the flash window 220. For example, the rear case 160 may be attached to the microphone substrate 230 and the flash window 220 through the adhesive member 240.

In an embodiment, the rear case 160 may have a third opening region in which the flash element 234 is disposed and a second microphone hole 169 fluidly connected with a sound inlet 2321 of the microphone element 232. The third opening region may be formed to penetrate the rear case 160 such that the flash element 234 disposed on the microphone substrate 230 faces the first part 221 of the flash window 220 in the Z-axis direction. In an embodiment, the second microphone hole 169 may be formed to penetrate the rear case 160.

In an embodiment, the second microphone hole 169 may be fluidly connected with the microphone hole 224 and the sound inlet 2321 of the microphone element 232 such that sound waves are transmitted. For example, vibration of air included in the space S and the microphone hole 224 may vibrate air included in the second microphone hole 169, and an audio signal may be propagated to the microphone element 232.

In an embodiment, the waterproof member 255 may be disposed between the rear case 160 and the lower surface 220b of the flash window 220. In an embodiment, the waterproof member 255 may prevent introduction of moisture into the microphone element 232 through the second microphone hole 169. In an embodiment, the waterproof member 255 may have various materials, structures, and shapes capable of transmitting vibration of air. For example, the waterproof member 255 may include a membrane in the form of a thin film, and the membrane may vibrate in response to vibration of air included in the microphone hole 224. The vibrating membrane may vibrate air included in the second microphone hole 169 of the rear case 160 and may transmit sound waves to the microphone element 232.

In an embodiment, the sealing member 257 may be disposed between the rear case 160 and the microphone substrate 230. For example, the sealing member 257 may be disposed on a stepped surface of the second microphone hole 169. The sealing member 257 may reduce introduction of noise generated from the inside of the electronic device 100 into the microphone element.

An electronic device 100 according to embodiments of the disclosure may include a housing 110, a printed circuit board 150 disposed in the housing, a microphone substrate 230 that is disposed in the housing 110 and electrically connected with the printed circuit board 150 and that has a microphone element 232 and a flash element 234 disposed thereon, a decorative member 210 that is disposed to at least partially face the microphone substrate 230 in a first direction and that forms a portion of a surface of the housing 110 and has a second opening 212 formed therein to be at least partially aligned with the flash element 234, and a flash window 220 that faces the decorative member 210 and includes a first part 221 at least partially accommodated in the second opening 212 and at least partially aligned with the flash element 234 in the first direction and a second part 222 that extends between the decorative member 210 and the microphone substrate 230 from the first part 221. The electronic device 100 may provide an audio input path along which a sound wave is propagated to the microphone element 232, and the audio input path may include a space S formed between the flash window 220 and the decorative member 210, a gap g formed between the first part 221 and an inner wall of the second opening 212 and fluidly connected with the space S, and a microphone hole formed in the second part 222 and fluidly connected with the microphone element and the space S.

In an embodiment, the microphone hole 224 may penetrate the second part 222 of the flash window 220 such that vibration of air generated in the space S is propagated to a sound inlet of the microphone element 232.

In an embodiment, the microphone element 232 may be at least partially aligned with the second part 222 of the flash window 220 in the first direction.

In an embodiment, the microphone substrate 230 may include any of a region, that at least partially flexibly extends toward the printed circuit board 150, and a flexible connecting member connected to the microphone substrate and the printed circuit board.

In an embodiment, the decorative member 210 may have a recess in which the flash window 220 is disposed, and the flash window 220 may include a protrusion 229 that protrudes to at least partially make contact with an inner wall of the recess 215.

In an embodiment, the electronic device may further include an adhesive member 240 that is disposed between the decorative member 210 and the flash window 220 and that surrounds the space S, and when viewed in the first direction, the gap g and the microphone hole 224 may be located in a region surrounded by the adhesive member 240.

In an embodiment, the adhesive member 240, when viewed in the first direction, may be formed in a closed form that surrounds the space S to seal the space S.

In an embodiment, the electronic device may further include a sealing member 257 that is disposed between the microphone substrate 230 and the flash window 220 and that seals the audio input path.

In an embodiment, the microphone substrate 230 may include a second surface 230b that faces the flash window 220 and a first surface 230a that faces away from the second surface 230b. The flash element 234 may be disposed on the second surface 230b, and the microphone element 232 may be disposed on the first surface 230a.

In an embodiment, at least a portion of the second part 222 of the flash window 220 may be disposed on the second surface 230b of the microphone substrate 230. The microphone substrate 230 may have a through-hole 2331 formed therein to penetrate the first surface 230a and the second surface 230b, and the through-hole 2331 may be fluidly connected with the microphone hole 224 and a sound inlet of the microphone element 232. The audio input path may further include the through-hole 2331.

In an embodiment, the electronic device may further include a waterproof member 255 that blocks introduction of moisture into the microphone element 232, and the waterproof member 255 may be at least partially disposed in the microphone hole 224.

In an embodiment, the microphone hole 224 may include a first hole portion 224-1 having a first size and a second hole portion 224-2 having a second size greater than the first size, and the waterproof member 255 may be at least partially disposed in the second hole portion 224-2.

In an embodiment, a stepped surface that faces the microphone substrate 230 may be formed in the second hole portion 224-2, and the waterproof member may be disposed on the stepped surface.

In an embodiment, the electronic device may further include a rear case 160 disposed between the flash window 220 and the microphone substrate 230, and a second microphone hole 224 fluidly connected with the microphone hole 224 and a sound inlet of the microphone element 232 may be formed in the rear case 160.

In an embodiment, when viewed in the first direction, a third opening region that at least partially overlaps the flash element 234 and the first part 221 of the flash window 220 may be formed in the rear case 160, and light emitted from the flash element 234 may pass through the third opening region and the first part 221 of the flash window 220.

An electronic device 100 according to embodiments of the disclosure may include a display 130, a back cover 180 that faces the display 130 and has a first opening 211 and a second opening 212 adjacent to the first opening 211, a side member 140 that surrounds a space between the display 130 and the back cover 180, a camera module 202 that is disposed in a camera region 281 of the back cover 180 and that receives light through the first opening, and a microphone module 200 that is disposed in a flash region 282 of the back cover 180 and that receives an audio signal through a portion of the second opening 212. The microphone module 200 may include a microphone substrate 230 that faces the flash region 282 and includes a microphone element 232 and a flash element 234, a flash window 220 including a first part 221 located between the flash element 234 and the flash region 282 and a second part 222 that extends from the first part 221 and that is located between the microphone element 232 and the flash region 282, the first part 221 of the flash window 220 including a protruding portion 223 that extends into the second opening 212, and an adhesive member 240 that attaches the flash region 282 and the flash window 220. A gap g fluidly connected with the space S may be formed between the protruding portion 223 and the second opening 212, and a microphone hole 224 fluidly connected with the microphone element 232 may be formed in the second part 222 of the flash window 220. The adhesive member 240 may be formed in a form that completely surrounds a predetermined region between the flash region 282 and the flash window 220, and the predetermined region may be fluidly connected with the gap g and the microphone hole 224.

In various embodiments, when the flash region 282 is viewed from above, one portion of the predetermined region may at least partially overlap the gap g, and another portion of the predetermined region may at least partially overlap the microphone hole 224.

In various embodiments, the electronic device may further include a waterproof member 255, at least a portion of which is disposed in the microphone hole 224.

In various embodiments, a bumpy region that induces diffuse reflection of light emitted from the flash element 234 may be formed on the first part 221 of the flash window 220.

In various embodiments, the microphone substrate 230 may include a second surface 230b that faces the flash window 220 and has the flash element 234 disposed thereon and a first surface 230a that faces away from the second surface 230b and has the microphone element 232 disposed thereon, and the microphone hole 224 may extend from the first surface 230a to penetrate the second surface 230b.

Figure 12:
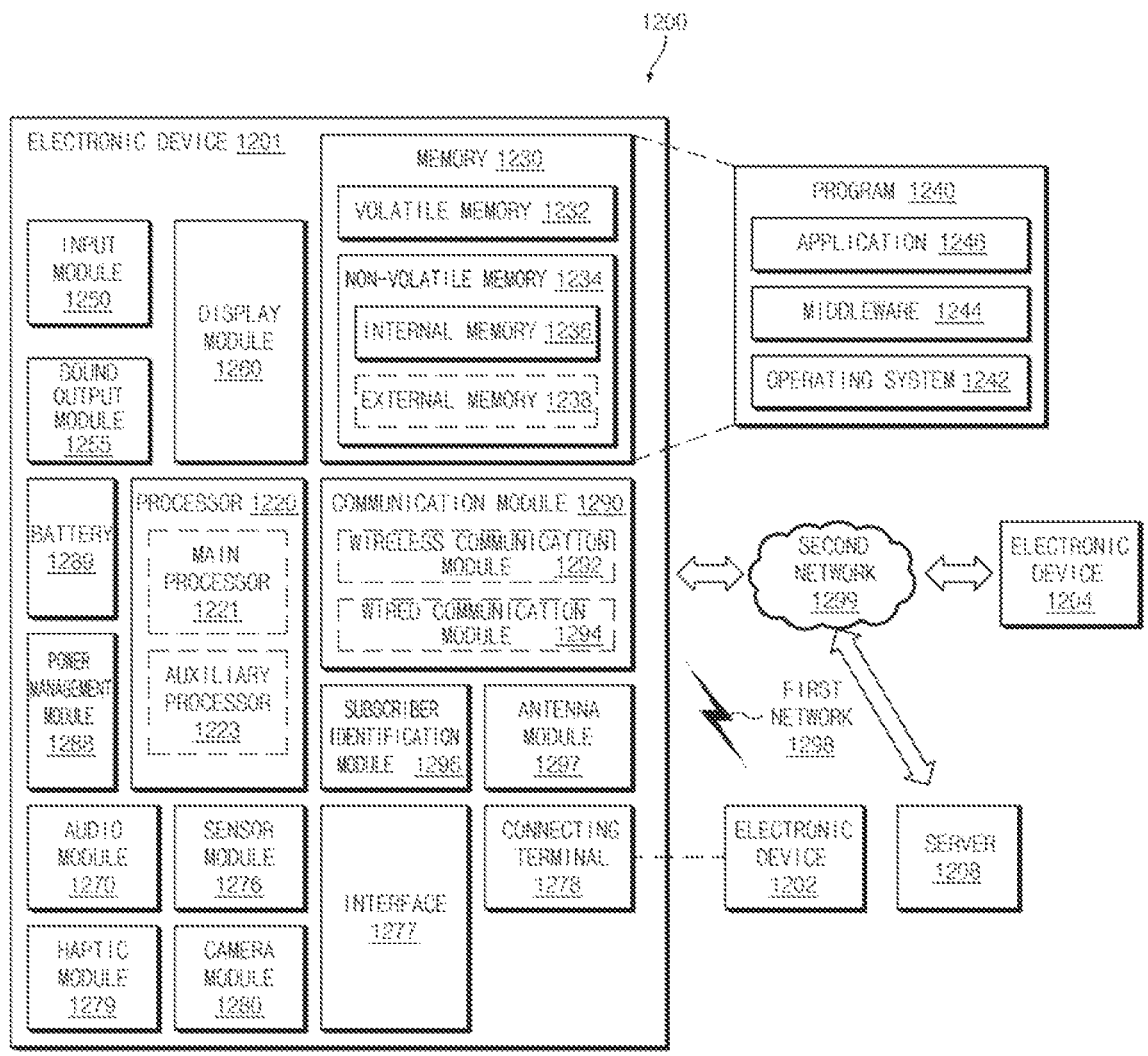
FIG. 12 is a block diagram of an electronic device in a network environment according to various embodiments.

FIG. 12 is a block diagram illustrating an electronic device 1201 in a network environment 1200 according to various embodiments.

Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
  a housing;
  a printed circuit board disposed in the housing;
  a microphone substrate disposed in the housing and electrically connected to the printed circuit board;
  a microphone disposed on the microphone substrate;
  a flash disposed on the microphone substrate;
  a cover disposed to at least partially face the microphone substrate in a first direction and configured to form a portion of a surface of the housing, the cover having an opening at least partially aligned with the flash;
  a flash window facing the cover, the flash window comprising a first part at least partially accommodated in the opening and at least partially aligned with the flash in the first direction, and a second part extended from the first part and between the cover and the microphone substrate; and
  an audio input path configured to propagate a sound wave to the microphone,
  wherein the audio input path comprises a space provided between the flash window and the cover, a gap provided between the first part and an inner wall of the opening and fluidly connected to the space, and a microphone hole in the second part and fluidly connected to the microphone and the space.

2. The electronic device of claim 1, wherein the microphone hole penetrates the second part of the flash window such that vibration of air in the space is propagated to a sound inlet of the microphone.

3. The electronic device of claim 1, wherein the microphone is at least partially aligned with the second part of the flash window in the first direction.

4. The electronic device of claim 1, wherein the microphone substrate comprises:
a region at least partially flexibly extended toward the printed circuit board; or
a flexible connecting member connected to the microphone substrate and the printed circuit board.

5. The electronic device of claim 1, wherein the cover has a recess in which the flash window is disposed, and
wherein the flash window comprises a protrusion contacting an inner wall of the recess.

6. The electronic device of claim 1, further comprising:
an adhesive member disposed between the cover and the flash window and surrounding the space,
wherein when viewed in the first direction, the gap and the microphone hole are disposed in a region surrounded by the adhesive member.

7. The electronic device of claim 6, wherein, along the first direction, the adhesive member is arranged in a closed form sealing the space.

8. The electronic device of claim 1, further comprising:
a sealing member disposed between the microphone substrate and the flash window, and configured to seal the audio input path.

9. The electronic device of claim 1, wherein the microphone substrate comprises a second surface facing the flash window, and a first surface facing away from the second surface,
wherein the flash is disposed on the second surface, and
wherein the microphone is disposed on the first surface.

10. The electronic device of claim 9, wherein at least a portion of the second part of the flash window is disposed on the second surface of the microphone substrate,
wherein the microphone substrate has a through-hole penetrating the first surface and the second surface, the through-hole being fluidly connected with the microphone hole and a sound inlet of the microphone, and
wherein the audio input path further comprises the through-hole.

11. The electronic device of claim 1, further comprising:
a waterproof member configured to block introduction of moisture into the microphone,
wherein the waterproof member is at least partially disposed in the microphone hole.

12. The electronic device of claim 11, wherein the microphone hole comprises a first hole portion having a first size and a second hole portion having a second size greater than the first size, and
wherein the waterproof member is at least partially disposed in the second hole portion.

13. The electronic device of claim 12, wherein a stepped surface facing the microphone substrate is formed in the second hole portion, and
wherein the waterproof member is disposed on the stepped surface.

14. The electronic device of claim 1, further comprising:
a rear case disposed between the flash window and the microphone substrate,
wherein a second microphone hole fluidly connected with the microphone hole and a sound inlet of the microphone is disposed in the rear case.

15. The electronic device of claim 14, wherein the rear case, when viewed in the first direction, comprises an opening region at least partially overlapping the flash and the first part of the flash window, and
wherein light emitted from the flash passes through the region and the first part of the flash window.

16. An electronic device comprising:
a display;
a back cover facing the display, the back cover comprising a first opening and a second opening adjacent to the first opening;
a side surrounding a space between the display and the back cover;
a camera disposed in a camera region of the back cover and configured to receive light through the first opening; and
a microphone module disposed in a flash region of the back cover and configured to receive an audio signal through a portion of the second opening,
wherein the microphone module comprises:
a microphone substrate facing the flash region;
a microphone disposed on the microphone substrate;
a flash disposed on the microphone substrate;
a flash window comprising a first part disposed between the flash and the flash region, and a second part extended from the first part and disposed between the microphone and the flash region, wherein the first part of the flash window comprises a protruding portion extended into the second opening; and
an adhesive member attaching the flash region and the flash window,
wherein a gap fluidly connected to the space is provided between the protruding portion and the second opening,
wherein a microphone hole fluidly connected to the microphone is provided in the second part of the flash window,
wherein the adhesive member is completely surrounds a region between the flash region and the flash window, and
wherein the region between the flash region and the flash window is fluidly connected to the gap and the microphone hole.

17. The electronic device of claim 16, wherein a portion of the region between the flash region and the flash window at least partially overlaps the gap, and
wherein another portion of the region between the flash region and the flash window at least partially overlaps the microphone hole.

18. The electronic device of claim 16, further comprising:
a waterproof member which is at least partially disposed in the microphone hole.

19. The electronic device of claim 16, wherein a bumpy region configured to induce diffuse reflection of light emitted from the flash is provided on the first part of the flash window.

20. The electronic device of claim 16, wherein the microphone substrate comprises a second surface facing the flash window and on which the flash is disposed, and a first surface facing away from the second surface and on which the microphone is disposed, and wherein the microphone hole is extended from the first surface and penetrates the second surface.

\* \* \* \* \*